G. N. GOODRICH.
METHOD OF CONSTRUCTING CRANK SHAFTS.
APPLICATION FILED FEB. 3, 1917.

1,235,026.  Patented July 31, 1917.

*INVENTOR.*
GEORGE N. GOODRICH
BY
*ATTORNEY.*

UNITED STATES PATENT OFFICE.

GEORGE N. GOODRICH, OF DETROIT, MICHIGAN.

METHOD OF CONSTRUCTING CRANK-SHAFTS.

1,235,026.   Specification of Letters Patent.   Patented July 31, 1917.

Application filed February 3, 1917. Serial No. 146,339.

*To all whom it may concern:*

Be it known that I, GEORGE N. GOODRICH, a citizen of the United States, residing at Detroit, county of Wayne, State of Michigan, have invented a certain new and useful Improvement in Methods of Constructing Crank-Shafts, and declare the following to be a full, clear, and exact description of the same, such as will enable others skilled in the art to which it pertains to make and use the same, reference being had to the accompanying drawings, which form a part of this specification.

This invention relates to methods of constructing weighted crankshafts. Counter-weights, which are now coming into some prominence with crankshafts to secure running balance, have heretofore been either welded on or bolted on. When they are welded on the expense is very heavy. It is also expensive to bolt them on and they are liable to come loose under the heavy centrifugal forces.

It is the object of this invention to construct a crankshaft provided with the necessary counter-weights at a minimum cost and with very efficient results.

In the drawings,—

It is a well known fact that the surfaces of drop forgings cannot approach closer than 7 or 8 degrees to the line of approach of the dies. Consequently it would not be ordinarily possible to drop-forge counter-weights on the crankshaft. Furthermore, the weights are so deep when viewed in cross section from the crankshaft that the dies for the counter-weights would have to be so much deeper relative to the die portions for the crankshaft proper that it would involve great, if not insurmountable, difficulties in providing the necessary stock for all of the die cavities.

Figure 1:
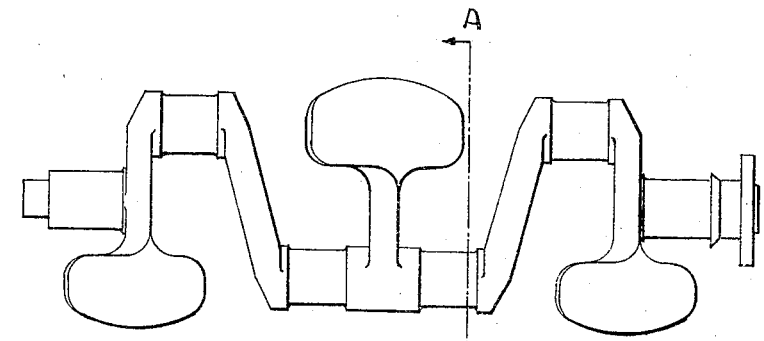
Figure 1 is an elevation of the crankshaft after the first operation, of the two-bearing and four-throw type.
Figure 2:
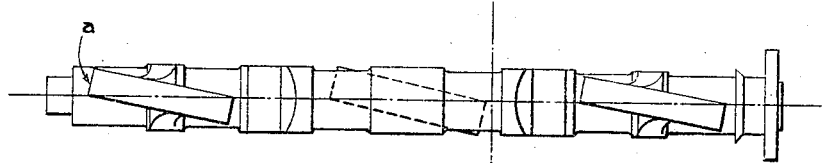
Fig. 2 is an elevation of the same looking up from the bottom of Fig. 1.
Figure 3:
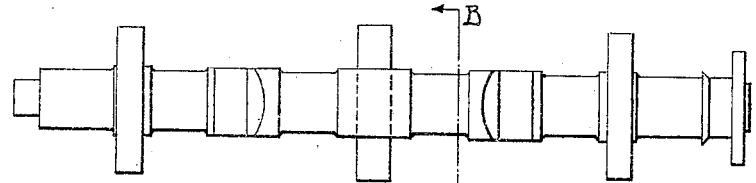
Fig. 3 is a similar elevation of the completed crankshaft.
Figure 4:
Fig. 4 is a cross section taken on the line A—A of Figs. 1 and 2.
Figure 5:
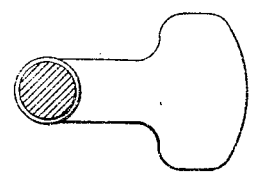
Fig. 5 is a cross section taken on the line B—B of Fig. 3.

I have found that by laying out a set of dies to produce a crankshaft as shown in Figs. 1 and 2 these difficulties can be overcome. As shown in Figs. 1 and 2, it will be seen that the counter-weights lie in a plane more nearly approximating the plane of the axis of the crankshaft instead of being perpendicular to the plane as shown in the finished crankshaft. They are, however, tipped from the plane of the axis of the crankshaft so that the ends of the counter-weights designated $a$ do not approach the line of travel of the dies closer than 7 or 8 degrees. In fact, as here shown, the angle is 12 or 15 degrees.

In this position the counter-weights could not be used for obviously they would interfere with the crank arms. The second part of the method consists in twisting these drop-forged counter-weights back where they belong. This twisting can be accomplished either by suitable dies or by a twisting machine which can have parts which clamp the main portion of the crankshaft in fixed position while other parts of the machine have jaws to twist the counter-weights. Twisting may take place while the metal is under the heat condition existing during the forging operation, or if the metal is of suitable properties the twisting can possibly be done while the metal is cold.

What I claim is:

1. The method of constructing crankshafts, comprising the forging of the crankshaft with the counter-weight or weights in a position more nearly approximating the plane of the axis of the crankshaft, and the subsequent twisting of the counter-weight or weights into a plane approximately perpendicular to the axis of the crankshaft.

2. The method of constucting crankshafts, comprising the forging of the crankshaft with the counter-weight or weights set at an angle to both the axis of the crankshaft and to a plane perpendicular to the axis of the crankshaft, and the subsequent twisting of the counter-weight or counter-weights to the desired position.

3. The method of constructing crankshafts, comprising the forging of the crankshaft with the counter-weight or weights more nearly approximating the plane of the axis of the crankshaft than a plane perpendicular to the axis of the crankshaft, and the twisting of the counter-weight or weights to a plane or planes substantially perpendicular to the axis of the crankshaft.

4. The method of constructing crankshafts, comprising the forging of a crankshaft and the counter-weights with the counter-weights distorted so as to present no surface within the prohibited angle of forging, and the twisting of the counter-weight or weights to a position in which some of the surfaces come within the prohibited angle of forging.

In testimony whereof I sign this specification.

GEORGE N. GOODRICH.